(12) United States Patent
Banerjee

(10) Patent No.: US 12,041,284 B2
(45) Date of Patent: Jul. 16, 2024

(54) METHODS, DEVICES, AND SYSTEMS FOR PUBLISHING KEY PICTURES

(71) Applicant: Synamedia Limited, Staines Upon Thames (GB)

(72) Inventor: Rahul Banerjee, West Bengal (IN)

(73) Assignee: Synamedia Limited, Staines Upon Thames (GB)

( * ) Notice: Subject to any disclaimer, the term of this patent is extended or adjusted under 35 U.S.C. 154(b) by 99 days.

(21) Appl. No.: 17/552,916

(22) Filed: Dec. 16, 2021

(65) Prior Publication Data
US 2023/0144200 A1 May 11, 2023

(30) Foreign Application Priority Data
Nov. 5, 2021 (IN) .............................. 202121050765

(51) Int. Cl.
*H04N 21/262* (2011.01)
*G06V 20/40* (2022.01)

(52) U.S. Cl.
CPC ....... *H04N 21/26266* (2013.01); *G06V 20/46* (2022.01)

(58) Field of Classification Search
None
See application file for complete search history.

(56) References Cited

U.S. PATENT DOCUMENTS

| | | | | |
|---|---|---|---|---|
| 2014/0247887 | A1* | 9/2014 | Brueck | H04N 19/40 375/240.26 |
| 2015/0371280 | A1* | 12/2015 | Bjordammen | G06Q 30/0269 705/14.66 |
| 2016/0308958 | A1* | 10/2016 | Navali | H04L 65/75 |
| 2016/0316235 | A1 | 10/2016 | Van Veldhuisen | |
| 2019/0356928 | A1 | 11/2019 | Braness et al. | |
| 2021/0120061 | A1 | 4/2021 | Labrozzi et al. | |
| 2021/0168472 | A1 | 6/2021 | Monaco et al. | |

FOREIGN PATENT DOCUMENTS

WO WO-2015123298 A1 * 8/2015 ........... H04L 65/605

OTHER PUBLICATIONS

DVB, "Digital Video Broadcasting (DVB); MPEG-DASH Profile for Transport of ISO BMFF Based DVB Services over IP Based Networks," DVB Document A168, Nov. 2017, pp. 1-110.

* cited by examiner

*Primary Examiner* — Omar S Parra
(74) *Attorney, Agent, or Firm* — Fernando & Partners, LLP

(57) ABSTRACT

Techniques for publishing key pictures at a server and using the key picture information for operations on a client device are described herein. In accordance with various embodiments, the server creates an intermediate unit including key picture(s) from media content. The server then generates map(s) specifying for each key picture, a type, properties, and an association to the intermediate unit. The server also packages the intermediate unit into key picture unit(s) according to the map(s). The client device obtains a manifest for the media content referencing the key picture(s) and the type of each key picture. Upon receiving a request to perform operation(s) on a respective key picture, the client device obtains a corresponding key picture unit and parses the manifest to determine a respective type. Based on the respective type matches a criterion, the client device performs the operation(s) on the key picture unit.

20 Claims, 12 Drawing Sheets

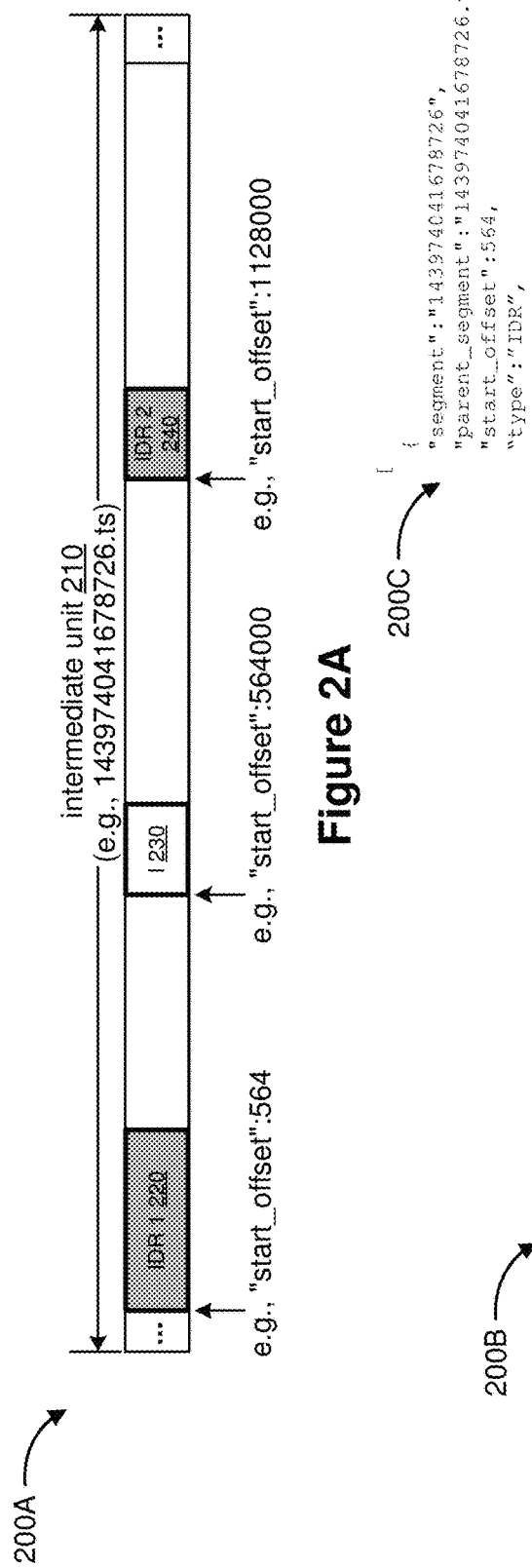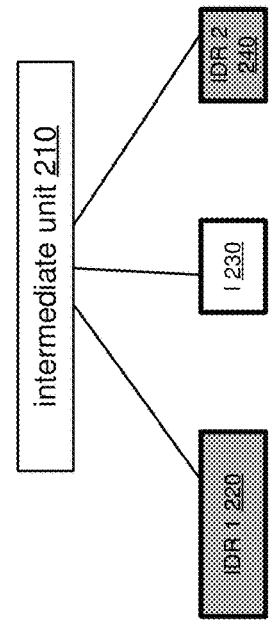

300A

```
<AdaptationSet bitstreamSwitching="false"
contentType="video" id="2" maxPlayoutRate="10"
mimeType="video/mp4" segmentAlignment="true" >
    <EssentialProperty schemeIdUri="http://dashif.org/
guidelines/trickmode" value="2"/>
    <SegmentTemplate
initialization="$RepresentationID$_init.mp4"
media="$RepresentationID$/$Time$.m4f"
startNumber="52210483" timescale="90000" >
        <SegmentTimeline>
            <S d="540000" r="1" t="1439740041678726"/>   310-1
            <S d="540000" r="1" t="1439740042218726"/>   310-2
        </SegmentTimeline>
    </SegmentTemplate>
    <Representation bandwidth="700000" height="396"
width="704" codecs="hvc1.1.6.L120" id="101/i-frame/hevc/
video-cif-stream-1_i-frame" />
    <Representation bandwidth="200000" height="180"
width="320" codecs="hvc1.1.6.L120" id="101/i-frame/hevc/
video-cif-stream-2_i-frame" />
</AdaptationSet>
```

```
<AdaptationSet bitstreamSwitching="false"
contentType="video" id="2" maxPlayoutRate="10"
mimeType="video/mp4" segmentAlignment="true" >
    <EssentialProperty schemeIdUri="http://dashif.org/
guidelines/trickmode" value="2"/>
    <SegmentTemplate
initialization="$RepresentationID$_init.mp4"
media="$RepresentationID$/$Time$.m4f" startNumber="52210483"
timescale="90000">
        <SegmentTimeline>
            <S d="180000" t="1439740041678726" ty="IDR"/>    320-1
            <S d="180000" t="1439740041858726" ty="I"/>
            <S d="180000" t="1439740042038726" ty="IDR"/>    320-2
            <S d="180000" t="1439740042218726" ty="IDR"/>
            <S d="180000" t="1439740042398726" ty="I"/>
            <S d="180000" t="1439740042578726" ty="I"/>
        </SegmentTimeline>
    </SegmentTemplate>
    <Representation bandwidth="700000" height="396"
width="704" codecs="hvc1.1.6.L120" id="101/i-frame/hevc/
video-cif-stream-1_i-frame" />
    <Representation bandwidth="200000" height="180"
width="320" codecs="hvc1.1.6.L120" id="101/i-frame/hevc/
video-cif-stream-2_i-frame" />
</AdaptationSet>
```

```
#EXTM3U
#EXT-X-VERSION:7
#EXT-X-PROGRAM-DATE-TIME:2020-08-05T05:54:27.227Z
#EXT-X-I-FRAMES-ONLY
#EXT-X-MAP:URI="init.mp4"
#EXT-X-TARGETDURATION:5
#EXT-X-MEDIA-SEQUENCE:48509453
#EXTINF:2,                                    ⎤ 420-1
#EXT-X-KEY-FRAME-TYPE:"IDR",                  |
14369461805O455.m4f                           ⎦
#EXTINF:2,
#EXT-X-KEY-FRAME-TYPE:"I",
14369461823O455.m4f
#EXTINF:2,                                    ⎤ 420-2
#EXT-X-KEY-FRAME-TYPE:"IDR",                  |
14369461841O455.m4f                           ⎦
#EXTINF:2,
#EXT-X-KEY-FRAME-TYPE:"I",
14369461859O455.m4f
#EXTINF:2,
#EXT-X-KEY-FRAME-TYPE:"IDR",
14369461877O455.m4f
#EXTINF:2,
#EXT-X-KEY-FRAME-TYPE:"I",
14369461895O455.m4f
```

```
#EXTM3U
#EXT-X-VERSION:7
#EXT-X-PROGRAM-DATE-TIME:2020-08-05T05:54:27.227Z
#EXT-X-I-FRAMES-ONLY
#EXT-X-MAP:URI="init.mp4"
#EXT-X-TARGETDURATION:5
#EXT-X-MEDIA-SEQUENCE:48509453
#EXTINF:6,                ⎤ 410-1
14369461805O455.m4f       ⎦
#EXTINF:6,                ⎤ 410-2
14369461859O455.m4f       ⎦
#EXTINF:6,
14369461913O455.m4f
```

Figure 4A

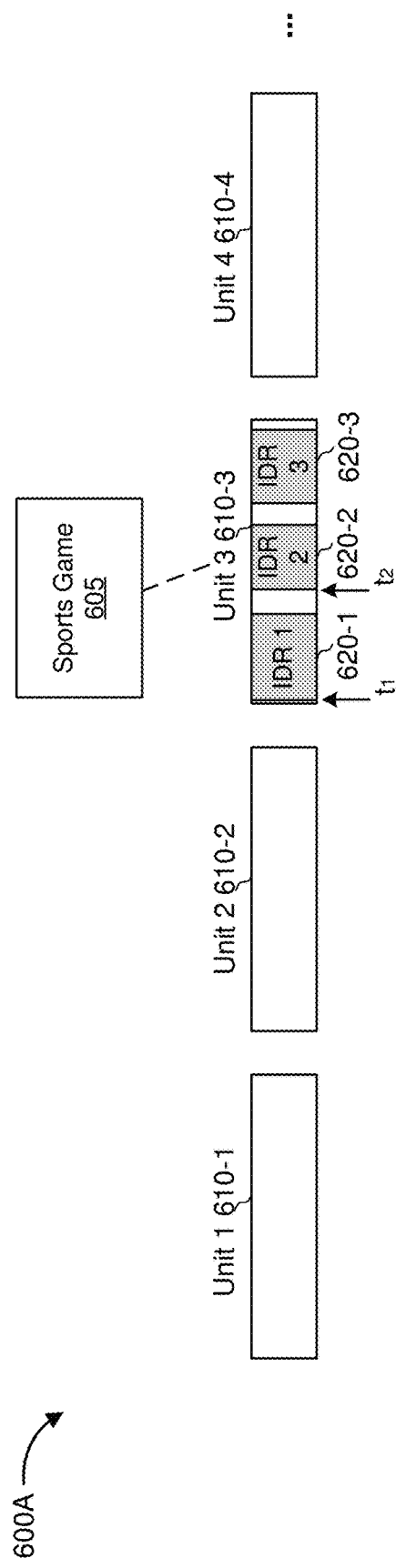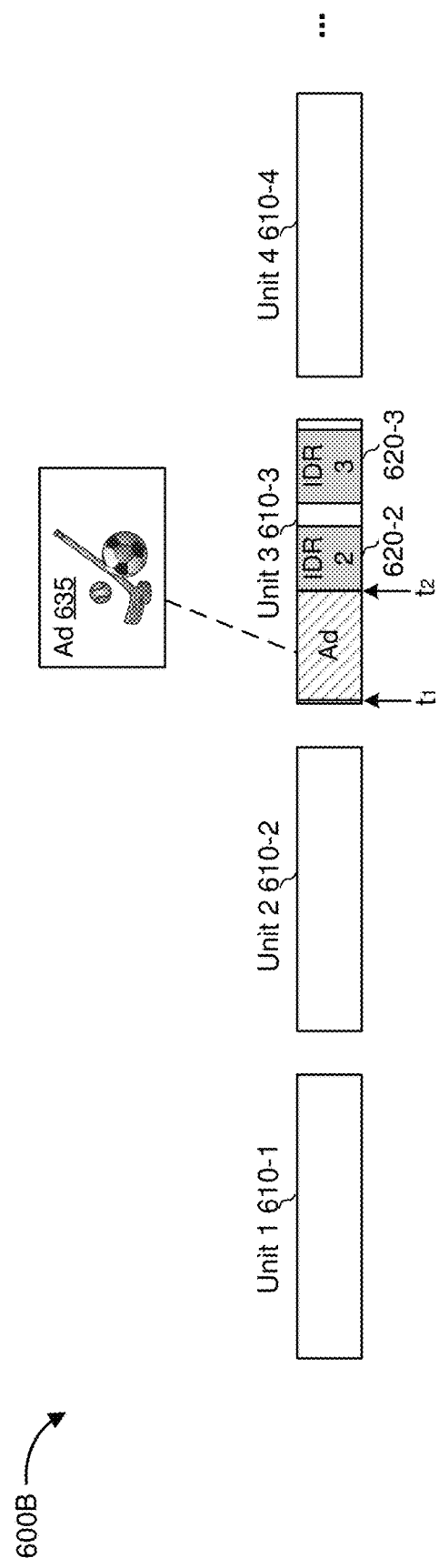

800

Perform the at least one operation on the key picture unit in accordance with a determination that the respective type of the respective key picture matches a criterion ⎯850

The media content is live content; the request to perform the at least one operation includes seeking to a latest unit of the live content; the criterion specifies the respective type of the respective key picture is an IDR picture; and performing the at least one operation includes: identifying the respective key picture being a last key picture within the latest unit; and seeking to the last key picture within the latest unit in accordance with the determination that the respective type of the respective key picture is the IDR picture ⎯856

The request to perform the at least one operation includes inserting targeted content starting at the respective key picture; the criterion specifies the respective type of the respective key picture is an IDR picture; and performing the at least one operation includes: identifying a first timestamp of the respective key picture and a second timestamp of an IDR picture within a unit according to the manifest; and inserting the targeted content within the unit between the first timestamp and the second timestamp ⎯858

Receive the key picture unit within the media content according to the manifest, wherein the key picture unit includes the respective key picture and is generated by a packager at a headend fetching a portion from an intermediate unit including the respective key picture according to a map and packaging the portion into the key picture unit ⎯860

Figure 8B

METHODS, DEVICES, AND SYSTEMS FOR PUBLISHING KEY PICTURES

CROSS-REFERENCE TO RELATED APPLICATION

This application claims the benefit of priority from Indian Patent Application No. 202121050765, filed on Nov. 5, 2021, the contents of which are hereby incorporated by reference.

TECHNICAL FIELD

The present disclosure relates generally to multimedia content streaming and, more specifically, to publishing key pictures for streaming multimedia content.

BACKGROUND

Some previously existing packagers store a key picture segment as a separate entity to maintain the compatibility between outputs in various formats, e.g., producing outputs according to specifications such as Dynamic Adaptive Streaming over HTTP (DASH), HTTP Live Streaming (HLS), Smooth Streaming, HTTP Dynamic Streaming (HDS), etc. When storing the media segments and the key picture segments separately, extracting the key pictures and storing them as separate entities drive up processing and storage costs. Further, even though a single media segment often includes more than one key picture (e.g., several I-pictures and/or IDR pictures), previously existing packagers merely publish the first key picture to the client. Without publishing every key picture within a segment, some key picture(s) at the sub segment level are not accessible by end users. Additionally, previously existing packagers do not specify whether a key picture is an I-picture or an IDR picture. Consequently, features that require access to a particular type of key picture cannot be offered, thus impacting the user experience.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 2A-2C are diagrams illustrating the association of key pictures with a parent intermediate unit, in accordance with some embodiments;

FIG. 3A illustrates an exemplary Media Presentation Description (MPD) file for Dynamic Adaptive Streaming over HTTP (DASH) without exposing key picture information for every key picture, in accordance with some embodiments;

FIG. 3B illustrates an exemplary MPD file for DASH with key picture information for every key picture, in accordance with some embodiments;

FIG. 4A illustrates an exemplary manifest file for HTTP Live Streaming (HLS) without exposing key picture information for every key picture, in accordance with some embodiments;

FIG. 4B illustrates an exemplary manifest file for HLS with key picture information for every key picture, in accordance with some embodiments;

FIGS. 6A and 6B are diagrams illustrating targeted content substitution, in accordance with some embodiments;

FIGS. 8A and 8B are flowcharts illustrating a method of using published key pictured information for operations on a client device, in accordance with some embodiments;

Figure 1:
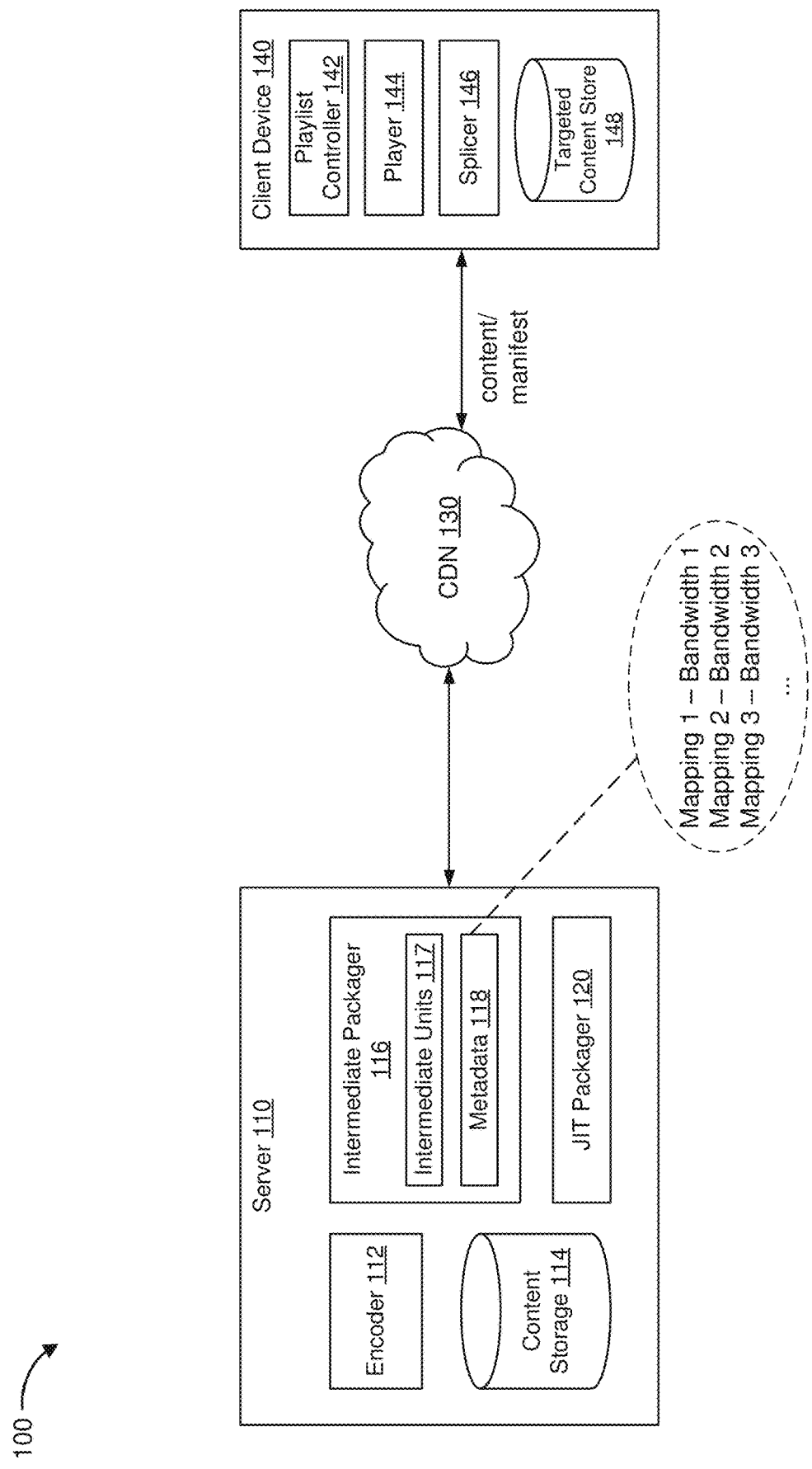
FIG. 1 is a block diagram of an exemplary multimedia content delivery system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, a method for publishing key pictures described herein solves the aforementioned addressability and cost issues by making every key picture addressable and/or accessible to end users. In some embodiments, an intermediate packager at a server (e.g., a headend) creates and maintains mapping(s) between a parent intermediate segment and key pictures within. A just-in-time (JIT) packager at the headend then publishes the type of each key picture to the clients, e.g., using attributes, tags, parameters, and/or values in a manifest. Publishing the type of each key picture maintains backward compatibility and involves minimal changes on the client side. For client devices that are capable of interpreting the new parameter in the manifest, such client devices can utilize the key picture information for improved user experience. For other client devices, the new attributes, tags, parameters, and/or values are ignored without causing errors.

In accordance with various embodiments, a key picture packaging and publishing method is performed at a server that includes including one or more processors and a non-transitory memory. The method includes creating an intermediate unit from media content, where the intermediate unit includes one or more key pictures. The method further includes generating one or more maps specifying a type of each of the one or more key pictures, properties of the one or more key pictures within the intermediate unit, and an association of each of the one or more key pictures to the intermediate unit. The method also includes packaging the intermediate unit into one or more key picture units according to the one or more maps.

In accordance with various embodiments, a method of using the key picture information for operations is performed at a client device that includes including a processor and a non-transitory memory. The method includes obtaining a manifest for media content, where the manifest references one or more key pictures in the media content and specifies a type of each of the one or more key pictures. The method further includes receiving a request to perform at least one operation on a respective key picture of the one or more key pictures. The method also includes obtaining a key picture unit within the media content corresponding to the respective key picture and parsing the manifest to determine a respective type of the respective key picture in response to the request. The method additionally includes performing the at least one operation on the key picture unit in accordance with a determination that the respective type of the respective key picture matches a criterion.

EXAMPLE EMBODIMENTS

Methods, devices, and systems in accordance with various embodiments described herein include a headend that generates mapping(s) and publishes key picture information according to the mapping(s). Publishing every key picture information solves the aforementioned cost and addressability issues in previously existing systems. By making every key picture addressable and publishing the key picture information to be accessible by the end user, key pictures are not stored separately, thus lowering storage and processing cost. Further, because each key picture is addressable, for trick mode, thumbnail scrubbing, seeking within a segment, and/or targeted content substitution, each individual key picture can be accessed and utilized to provide more access points and access points that are closer to the point of interest, thus improving user experience.

Reference is now made to FIG. 1, which is a block diagram of an exemplary multimedia content delivery system 100 in accordance with some embodiments. In some embodiments, the multimedia content delivery system 100 includes a server 110 (e.g., a headend), a content delivery network (CDN) 130, and a client device 140. Although a single server 110, a single CDN 130, and a single client device 140 are illustrated in FIG. 1, the system 100 can include one or more servers 110 as well as one or more client devices 140, and can include zero, one, or more CDNs 130. For instance, the CDN(s) 130 can be included in the system 100 for scalability. As such, the server 110 provides multimedia content to the client device(s) 140, optionally via the CDN(s) 130. For the sake of simplicity, the subject matter will be described hereinafter for the most part with reference to a single server 110, a single client device 140, and a single CDN 130.

In some embodiments, the server 110 includes an encoder 112 for encoding multimedia content from a content storage 114 (e.g., live or video-on-demand (VOD) content), an intermediate packager 116 for receiving the encoded content from the encoder 112 and creating intermediate units 117 and corresponding metadata 118, and a just-in-time (JIT) packager 120 for identifying relevant portion(s) within the intermediate units 117 according to request(s) from the client device 140 and converting the relevant portion(s) to a suitable format for adaptive bitrate (ABR) streaming.

As used herein, the multimedia content (also referred to hereinafter as "media content", "media content item(s)", "media asset", or "content") provided by the server 110 and received by the client device 140 can include any multimedia data, such as visual data, audio data, and/or text, etc. Further, the content prepared by the server 110 and received by the client device 140 can be in a variety of encoding and/or packaging formats. For example, the encoder 112 can encode the content from the content storage 114 and output content including video and/or audio encoding types such as MPEG 2, MPEG 1, advanced video coding (AVC), AC3, high efficiency video coding (HEVC), etc. In another example, the intermediate packager can package the encoded content to create the intermediate units 117 according to Common Interchange Format (CIF) (e.g., for MPEG 2 transport stream (TS)) or Common Media Application Format (CMAF) (e.g., for FMP4 segment according to the ISO Base Media File Format (ISO_BMFF)). In yet another example, based on the request from the client device 140, the JIT packager 120 can package the intermediate units 117 content according to Dynamic Adaptive Streaming over HTTP (DASH), HTTP Live Streaming (HLS), Smooth Streaming, or HTTP Dynamic Streaming (HDS) format and construct manifest in accordance with HLS or DASH.

In some embodiments, the intermediate packager 116 identifies key pictures in the encoded content from the encoder 112 when creating the intermediate units 117. For example, the intermediate packager 116 can parse an MPEG 2 TS from the encoder 112 and identify a transport stream packet header with payload_unit_start_indicator bit set and the adaptation header field with random_access_indicator bit set. The combination of the payload_unit_start_indicator bit and the random_access_indicator bit indicates the start of a key picture. In another example, for BMFF content, the key picture can be identified based on the information in the trun box, which includes details about the samples.

Upon identifying the key pictures while packaging the intermediate units, the intermediate packager 116 also creates the metadata 118, e.g., CIF or CMAF manifest, and records mappings as part of the metadata 118 in accordance with some embodiments. For example, the intermediate packager 116 (e.g., a CIF packager) receives the MPEG 2 TS content from the encoder 112 and creates fixed duration MPEG 2 TS segments as the intermediate units 117. The intermediate packager 116, while creating CIF segments as the intermediate units 117, also creates mapping file(s) depicting the association between every key picture and the CIF segment (e.g., the parent intermediate segment) the key picture resides in. In some embodiments, the mapping file includes the type of the key picture (e.g., an I-picture or an instantaneous decoding refresh (IDR) picture) and properties of the key picture. Such properties include, but are not limited to, the start offset of the key picture within the parent intermediate segment, the size of the key picture, the parent intermediate segment, and/or the timestamp associated with the key picture, etc. As shown in FIG. 1, in some embodiments, the intermediate packager 116 maintains one mapping file for each bandwidth to ensure the proper start offsets of the key pictures for the bandwidth. Exemplary associations of an intermediate unit with key pictures are shown in FIGS. 2A-2C and described in detail below.

On the receiving end, in some embodiments, the client device 140 includes a playlist controller 142 for requesting and obtaining playlist and/or manifest files and a player 144 for playing the content from the server 110 via the CDN 130 according to the playlist and/or the manifest. In some embodiments, the client device 140 also includes a splicer 146 for splicing targeted content from a targeted content store 148 and/or inserting the target content, e.g., advertisement substitution and/or splicing.

It should be noted that one or more components and/or functions of the server 110 and/or the client device 140 may be distributed and/or re-arranged. For example, the content storage 114 and/or the encoder 112 can be on a different and distinct server from the server hosting the intermedia packager 115 and/or the JIT packager 120. As such, the server 110 and/or the client device 140 in the exemplary content delivery system 100 can include more, less, and/or different elements than shown in FIG. 1. Each of the components in the content delivery system 100 can include appropriate hardware, software, and/or firmware to perform the operations attributed to the element herein. Operation(s) attributed to an element in the content delivery system 100 herein should not be considered binding and in some embodiments, other element(s) in the exemplary system 100 may additionally or alternatively perform such operation(s).

FIGS. 2A-2C are diagrams 200A-200C illustrating the association of an exemplary intermediate unit with key pictures in accordance with some embodiments. In FIG. 2A, the intermediate packager (e.g., the intermediate packager 116, FIG. 1) identifies three key pictures within an exemplary intermediate unit 210, e.g., IDR picture 1 220, an I-picture 230, and IDR picture 2 240. For example, the intermediate unit 210 can be a MPEG 2 TS segment 143974041678726.ts. Within the MPEG 2 TS segment, IDR picture 1 220 is located at offset 564, I-picture 230 is located at offset 564000, and IDR picture 2 240 is located at offset 1128000.

Upon identifying the key pictures 220-240, in some embodiments, the intermediate packager creates a map as shown in FIG. 2B. The map illustrates the intermediate unit 210 being the parent unit of the three key pictures 220-240. In some embodiments, the intermediate packager creates a mapping file based on the map. An exemplary map file is shown in FIG. 2C. In some embodiments, the intermediate packager stores and maintains the map in FIG. 2B and/or the mapping file in FIG. 2C as the metadata 118 (FIG. 1).

As shown in FIG. 2C, in some embodiments, the exemplary mapping file identifies IDR picture 1 220 (e.g., "segment": "143974041678726"), I-picture 230 (e.g., "segment": "143974041858726"), and IDR picture 2 240 (e.g., "segment": "143974042038726") as virtual entities within the parent segment 210 (e.g., "parent_segment": "143974041678726.ts"). Further, the mapping file specifies the type of each of the key pictures, e.g., IDR picture 1 220 and IDR picture 2 240 with "type": "IDR" and I-picture 220 with "type": "I". Additionally, in some embodiments, the mapping file also specifies properties of each of the key pictures, such as the location of the key picture in terms of the start offset within the parent media segment 210, the size of the key picture in terms of bytes, and/or the timestamp associated with the key picture, etc.

In some embodiments, for linear content (e.g., live manifest), the intermediate packager maintains the map and/or the mapping file to ensure that key pictures specified in the map and/or the mapping file pertaining to the parent segments are within the time shift buffer depth to accommodate playbacks. In some embodiments, for VOD content (e.g., non-growing manifest), the intermediate packager maintains the map and/or the mapping file to ensure that the key pictures specified in the map and/or the mapping file are in the media segments of the VOD content. With the map and/or the mapping file, the intermediate packager does not store key picture segments as separate physical entities, thus reducing storage and processing costs.

In some embodiments, the JIT packager (e.g., the JIT packager 120, FIG. 1) receives a manifest request from the client device (e.g., the client device 140, FIG. 1). The manifest being requested can be a Media Presentation Description (MPD) file for DASH or an I-frame manifest for HLS in accordance with various embodiments. In response to the manifest request, the JIT packager fetches the latest and the appropriate mapping file (e.g., for the proper bandwidth). In some embodiments, having obtained the mapping file, the JIT packager parses the mapping file, extracts the key picture information, and places the key picture information at appropriate locations in the manifest, e.g., in the I-frame adaptation set section in the MPD for DASH as shown in FIG. 3B or in the I-frame manifest/playlist for HLS as shown in FIG. 4B.

FIG. 3A illustrates an exemplary manifest file 300A without exposing the key picture information for every key picture, and FIG. 3B illustrates an exemplary manifest file 300B with the key picture information for every key picture in accordance with some embodiments. In FIG. 3A, an I-frame adaptation set section in an exemplary MPD file for DASH includes a first entry 310-1 and a second entry 310-2 along the segment timeline. Two key pictures at the start of the entries 310-1 and 310-2 can be accessed by the client, e.g., one key picture with timestamp "143974041678726" and another key picture with timestamp "143974042218726". As shown in FIG. 3A, in previously existing systems, other than the first key picture within each segment, information of subsequent key pictures within a segment is not published and not accessible by end users.

Assuming there is a key picture every 2 s within each segment, as shown in FIG. 3B, for each segment, the MPD includes the key picture information for three key pictures. For example, instead of having one entry 310-1 for the 6 s segment "143974041678726" as shown in FIG. 3A, in FIG. 3B, as indicated by a first box 320-1, the JIT packager places three entries representing the key picture information for three key pictures within the segment. Further, the JIT packager indicates the type for each of the key pictures, e.g., specifying ty="IDR" for key picture "143974041678726", ty="I" for key picture "143974041858726", and ty="IDR" for key picture "143974042038726". In another example, instead of having one entry 310-2 for the 6 s segment "143974042218726" as shown in FIG. 3A, in FIG. 3B, as indicated by a second box 320-2, the JIT packager places three entries representing the key picture information for three key pictures within the segment. Further, the JIT packager indicates the type for each of the key pictures, e.g., specifying ty="IDR" for key picture t="143974042218726", ty="I" for key picture t="143974042398726", and ty="I" for key picture t="143974042578726".

In some embodiments, the custom attribute s@ty shown in FIG. 3B for DASH specifies whether a key picture is a safe seek point, e.g., whether the key picture is an I-picture or an IDR picture. In the case of the key picture being an IDR picture, the key picture is a safe seek point, i.e., any subsequent picture to the IDR picture can be decoded without referencing any picture prior to the IDR picture. As such, with the key picture information in the MPD, the client devices have access to any key picture and to the proper type of key picture. Further, since DASH MPD is an XML document, the client devices can use a standard XML parser to parse the MPD as shown in FIG. 3B. In the case of a client device not recognizing the custom s@ty attribute, the client device ignores the attribute in accordance with some embodiments, thus ensuring backward compatibility. Accordingly, the MPD as shown in FIG. 3B can be used by any client device capable of processing XML documents.

FIG. 4A illustrates an exemplary manifest file 400A without exposing key picture information for every key picture and FIG. 4B illustrates an exemplary manifest file 400B with the key picture information for every key picture in accordance with some embodiments. An HLS fragmented MP4 I-frame variant manifest identifies a plurality of media files, with each media file being identified by a media file URL preceded by an EXTINF tag and a duration of the media file. In FIG. 4A, a first entry 410-1 identifies a media file 143694618050455.m4f that has a duration of 6 s, and a second entry 410-2 identifies a media file 143694618590455.m4f that also has a duration of 6 s. Each of these media files corresponds to a key picture segment. However, between the first entry 410-1 and the second entry 410-2, there are multiple key pictures. As shown in FIG. 4A, in previously existing systems, other than the first key picture being packaged into I-frame segment 143694618050455.m4f and the second key picture being packaged into I-frame segment 143694618590455.m4f, key pictures in between the first key picture and the second key picture are not published and not accessible by end users.

Assuming there is a key picture every 2 s within each fragment, as shown in FIG. 4B, the manifest for HLS includes the key picture information for three key pictures within the fragment. For example, instead of having one entry 410-1 for the 6 s media file 143694618050455.m4f as shown in FIG. 4A, in FIG. 4B, as indicated by a first box 420-1, the JIT packager places three entries representing the key picture information for three key pictures within the fragment. Further, the JIT and indicates the type for each of the key pictures, e.g., a 2 s media file 143694618050455.m4f with EXT-X-KEY-FRAME-TYPE: "IDR", followed by a 2 s media file 143694618230455.m4f with EXT-X-KEY-FRAME-TYPE: "I", and followed by a 2 s media file 143694618410455.m4f with EXT-X-KEY-FRAME-TYPE: "IDR". In another example, instead of having one entry 410-2 for the 6 s media file 143694618590455.m4f as shown in FIG. 4A, in FIG. 4B, as indicated by a second box 420-2, the JIT packager places three entries representing the key picture information for three key pictures within the fragment and indicates the type for each of the key pictures, e.g., a 2 s media file 143694618590455.m4f with EXT-X-KEY-FRAME-TYPE: "IDR", followed by a 2 s media file 143694618770455.m4f with EXT-X-KEY-FRAME-TYPE: "IDR", and followed by a 2 s media file 143694618950455.m4f with EXT-X-KEY-FRAME-TYPE: "I".

In the exemplary HLS manifest 400B, similar to the custom attribute s@ty described above with reference to FIG. 3B, the EXT-X-KEY-FRAME-TYPE tag is a custom tag in some embodiments. In the case of a client device not recognizing the EXT-X-KEY-FRAME-TYPE tag, the client device ignores the custom tag, thus ensuring backward compatibility. Even if a client device does not recognize the custom attribute s@ty and/or the custom tag EXT-X-KEY-FRAME-TYPE, because more key pictures are available, the client device benefits from features such as more fine grained trick mode playback and/or thumbnail scrubbing. Accordingly, the manifest as shown in FIGS. 3B and 4B can be used by any client device for improved user experience and the key picture publishing method described herein makes every key picture available without storing the key pictures as separate entities.

Figure 5:
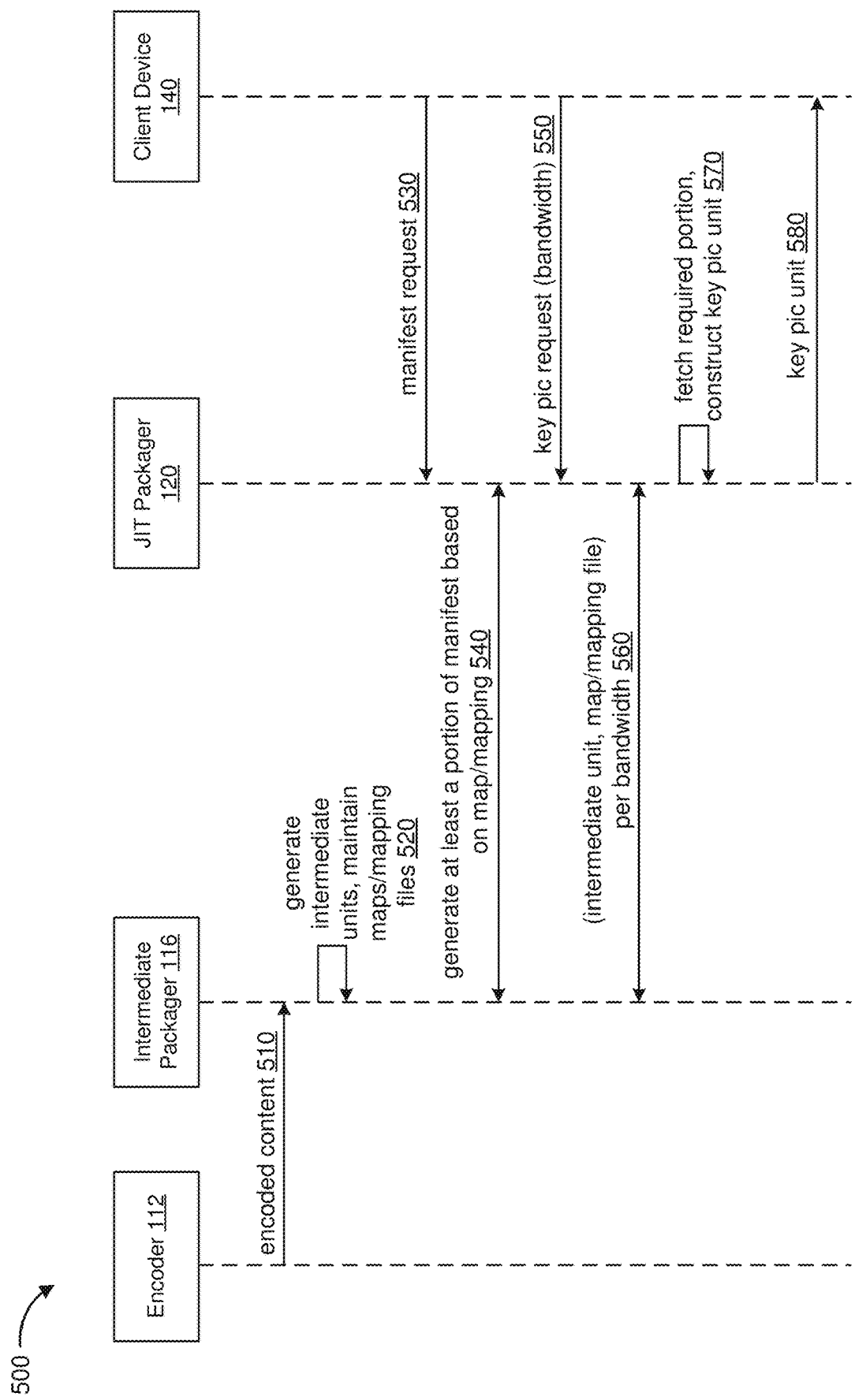
FIG. 5 is a sequence diagram illustrating generating and publishing key picture information, in accordance with some embodiments.

FIG. 5 is a sequence diagram 500 illustrating generating and publishing key picture information in accordance with some embodiments. In some embodiments, in step 510, the intermediate packager 116 obtains the encoded content from the encoder 112. In some embodiments, in step 520, the intermediate packager 116 packages the encoded content into intermediate units and generates maps (e.g., as shown in FIG. 2B) and/or mapping files (e.g., as shown in FIG. 2C) to record key picture information and to establish the associations of the key pictures with a respective parent intermediate unit as described above with reference to FIGS. 2A-2C. When the JIT packager 120 receives a manifest request in step 530, the JIT packager generates at least a portion of the manifest (e.g., the I-frame adaptation set portion of the MPD file for DASH as shown in FIG. 3B or adding the custom tag EXT-X-KEY-FRAME-TYPE to the manifest file for HLS as shown in FIG. 4B) based on the maps and/or the mapping files in step 540.

Further, when the JIT packager 120 receives a key picture request from the client device 140 in step 550, the JIT packager 120 obtains the bandwidth information along with the key picture request. Accordingly, in step 560, the JIT packager 120 ensures it has the up-to-date mapping file corresponding to the bandwidth (e.g., one of the mapping files from the metadata 117 in FIG. 1) and based on the mapping file, obtains the corresponding intermediate unit from the intermediate packager 116. Further, in step 570, based on the mapping file, the JIT packager 120 fetches the required portion for the requested key picture from the parent intermediate unit, constructs a key picture unit in accordance with some embodiments. In some embodiments, in step 580, the JIT packager 120 sends the key picture unit to the client device 140.

In some embodiments, instead of the JIT packager 120 obtaining the intermediate unit and the mapping file in step 560 and fetching the required portion in step 570, the JIT packager 120 forwards the key picture request to the intermediate packager 116. In such embodiments, the intermediate packager 116 keeps the mapping file within the intermediate packager 116, e.g., stored as the metadata 118 (FIG. 1). When the key picture request comes to the JIT packager 120, the JIT packager 120 forwards the key picture request to the upstream intermediate packager 116 along with the bandwidth requirement. In some embodiments, the intermediate packager 116 then locates the mapping file corresponding to the bandwidth, uses the mapping file to fetch the required portion from its parent intermediate unit, and returns the required portion to the JIT packager 120 in an intermediate format, e.g., CIF or CMAF format. In some embodiments, the JIT packager 120 converts the required portion to the key picture unit, e.g., into an HLS or DASH segment.

In some embodiments, a key picture unit is a key picture segment. As used herein, a key picture segment refers to a segment that includes one I-picture or one IDR picture. In previously existing solutions, the key picture segments are created by the intermediate packager and stored within the intermediate packager to be retrieved by the JIT packager in response to the request from the client device. The storage and processing overhead is high for such previously existing solutions. With the key picture publishing methods, devices, and systems described herein, the key pictures are not created and stored at the intermediate level. The maps and the mapping files allow the intermediate packager 116 to create virtual entities corresponding to the key pictures within each intermediate unit. As shown in FIG. 5, when the key picture request from the client device 140 comes to the JIT packager 120, e.g., in step 550, the JIT packager 120 obtains the key picture data based on the mapping file from the parent intermediate unit and then repackages the key picture data to the key picture segment. As such, relative to previously existing solutions where physical entities for the key pictures are created and stored at the intermediate level, creating virtual entities and references corresponding to the key pictures by the intermediate packager 116 reduces processing and storage costs.

Publishing the key picture information for every available key picture enhances ABR content viewing experience. For example, when previewing the content through thumbnail scrubbing, no important scene is missed, e.g., every key picture can be previewed. In another example, because each key picture is accessible, I-frame trick mode is smoother and seeking at a sub segment level is possible. For live content, tuning to and/or starting to play from the last IDR picture within the latest segment available within a live manifest reduce the latency to the live point.

FIGS. 6A and 6B are diagrams 600A and 600B illustrating targeted content substitution in accordance with some embodiments. In previously existing OTT advertisement splicing or substitution solutions, substitution is possible at the segment level, i.e., substituting segment(s) with advertisement segments. Using the key picture publishing method described herein, once the key picture information for every key picture and the corresponding key picture type are published, the client device (e.g., the client device 140, FIG. 1) can perform client-side targeted content insertion, substitution, and/or splicing at the sub segment level.

In FIG. 6A, a media content item includes a plurality of units, e.g., unit 1 610-1, unit 2 610-2, unit 3 610-3, unit 4 610-4, etc. Within a given segment, e.g., unit 3 610-3, there are three IDR pictures, e.g., IDR picture 1 620-1 with timestamp $t^1$, IDR picture 2 620-2 with timestamp $t_2$, and IDR picture 3 620-3. The gap between the start of IDR picture 1 620-1 at $t_1$ and the start of IDR picture 2 620-2 at $t_2$ is, for example, 2 seconds. In FIG. 6B, the client device stores a targeted content item 635, e.g., an advertisement that is 2 seconds long and stored in the targeted content store 148 (FIG. 1). With appropriate signaling, e.g., scte-35 signaling, the client device (e.g., the splicer 146, FIG. 1) can replace a portion of the content from the start of IDR picture 1 620-1 at time $t_1$ till the start of IDR picture 2 620-2 at time $t_2$ with pre-stored targeted content. Once replaced, because the transition to the media content item is at the start of IDR picture 2 620-2, e.g., any subsequent picture to IDR picture 2 620-2 can be decoded without referencing any picture prior to IDR picture 2 620-2, the playback works smoothly without disruption.

The targeted content 635 has such a short duration that it does not impact the viewing experience of the sports content provided by unit 3 610-3. Inserting small chunks of targeted content at the sub segment level allows context-sensitive advertisement insertion, which is more appealing and relatable to end users. For example, during a sports game, e.g., after a well-known player scores a goal, a short sports equipment advertisement featuring the player is more appealing and relatable to the viewers. Such contextual advertisements in small chunks are less irritating, thus potentially influencing the users more effectively and increasing the chance of receiving a response.

Figure 7A:
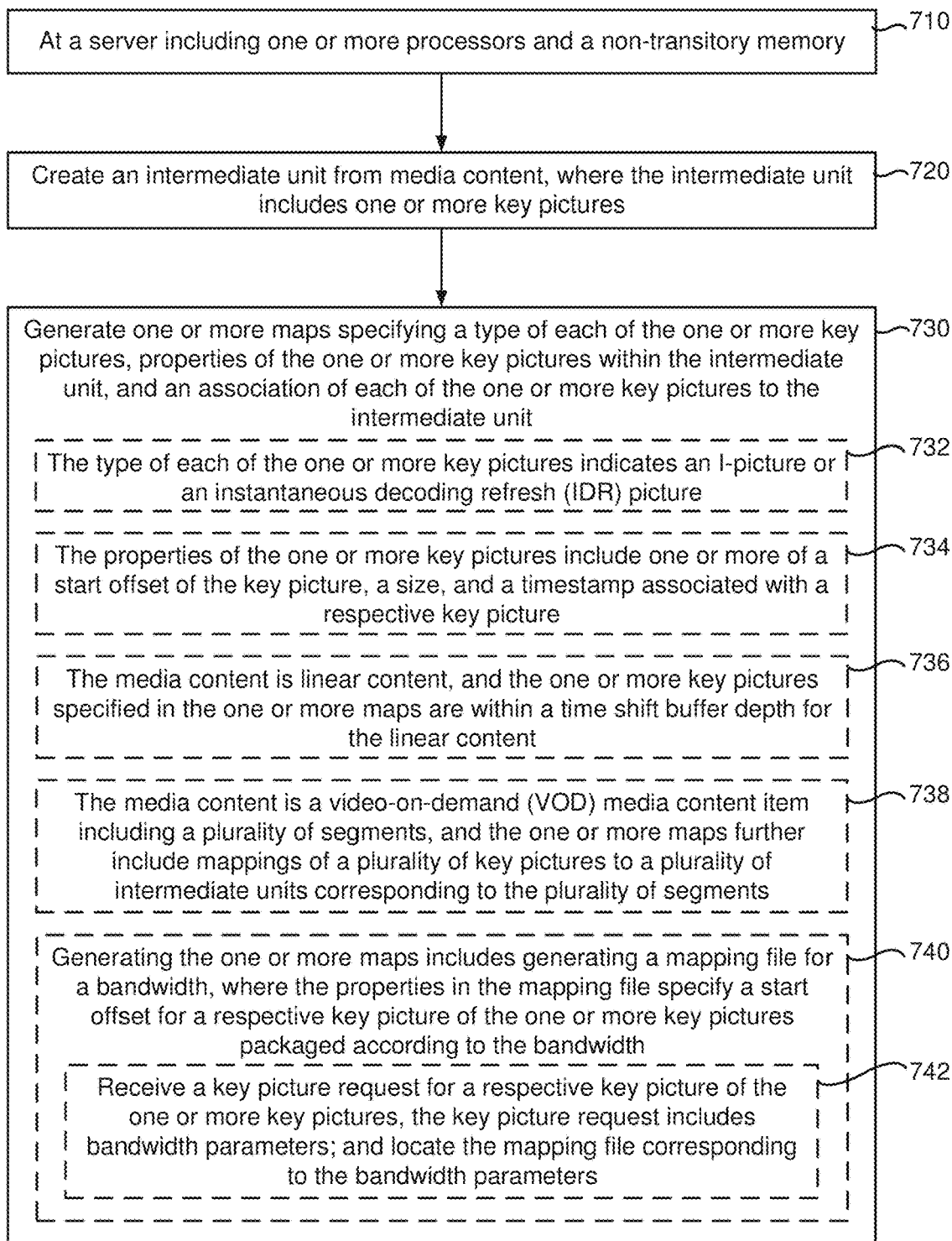
FIGS. 7A and 7B are flowcharts illustrating a method of packaging and publishing key pictures, in accordance with some embodiments.
Figure 7B:
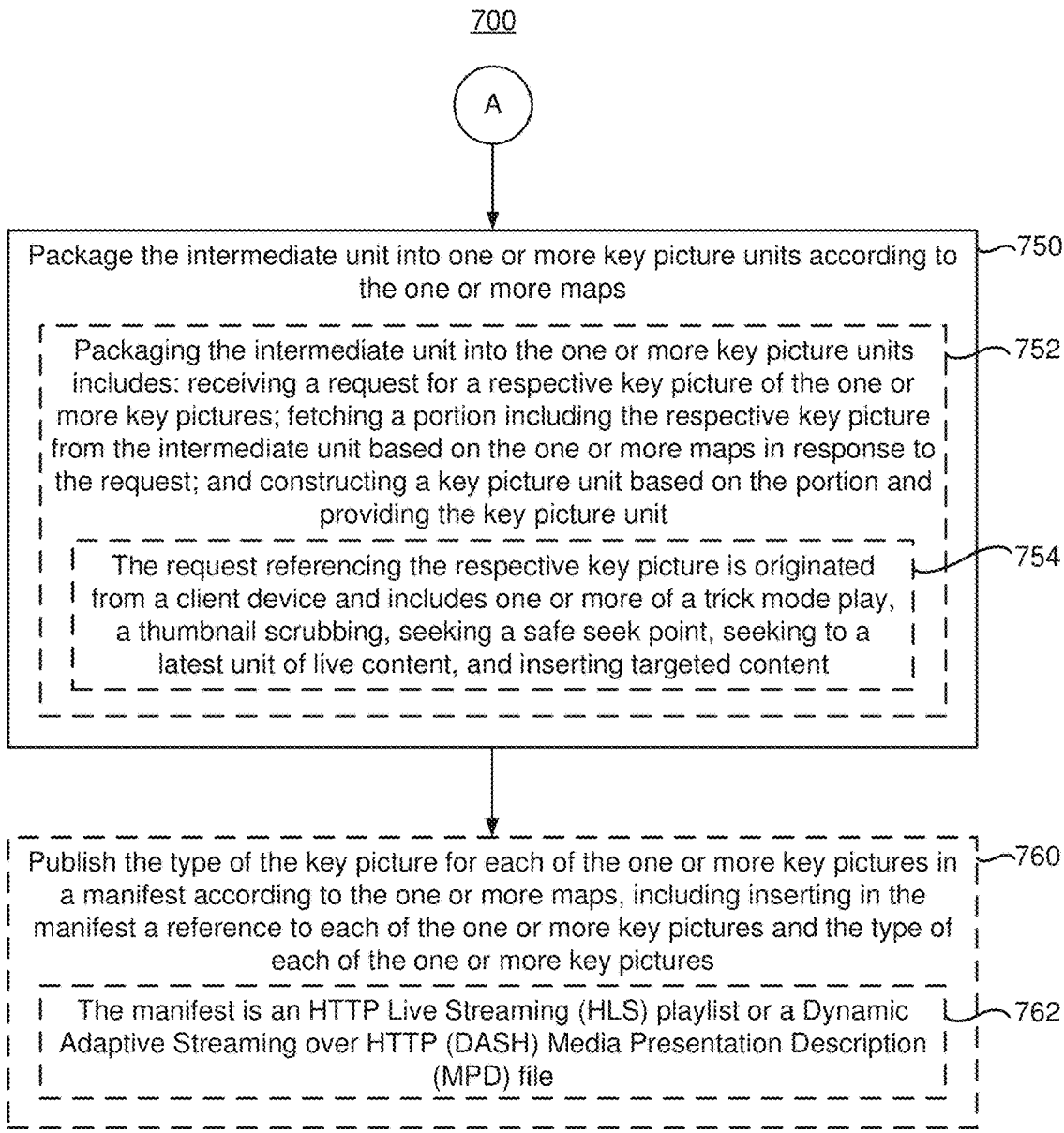

FIGS. 7A and 7B are flowcharts illustrating a method 700 of packaging and publishing key pictures in accordance with some embodiments. In some embodiments, as represented by block 710, the method 700 is performed at a server, e.g., the server 110 in FIG. 1 hosting a headend. In some embodiments, the server includes one or more processors (e.g., one or more processors for the encoder 112, the intermediate packager 116, and/or the JIT packager 120 in FIG. 1) and a non-transitory memory (e.g., a non-transitory memory for storing the content in the content storage 114, the intermediate units 117, and/or the metadata 118 in FIG. 1).

The method 700 begins with the server creating an intermediate unit from media content as represented by block 720, e.g., the intermediate packager 116 receiving encoded media content from the encoder 112 and creating the intermediate units 117 from the encoded media content. In some embodiments, the intermediate unit includes one or more key pictures. For example, the intermediate unit can be a segment of CIF MPEG 2 or CMAF BMFF format, and each CIF segment or CMAF fragment can have one or more I-pictures or IDR pictures. In FIG. 2, the intermediate unit 210 includes three pictures 210-240.

The method 700 continues, as represented by block 730, with the server (e.g., the intermediate packager 116, FIG. 1) generating one or more maps specifying a type of each of the one or more key pictures, properties of the one or more key pictures within the intermediate unit, and an association of each of the one or more key pictures to the intermediate unit. For example, as shown in FIG. 1 and in step 520 of FIG. 5, while creating the intermediate segments, the intermediate packager 116 creates maps and/or stores the maps in the metadata 118. In another example, in FIGS. 2B and 2C, the intermediate packager 116 generates a map and/or a mapping file depicting the association between every key picture and the parent intermediate segment that the key pictures reside in.

In some embodiments, as represented by block 732, the type of each of the one or more key pictures indicates an I-picture or an instantaneous decoding refresh (IDR) picture, e.g., in the mapping file as shown in FIG. 2C, each of the key pictures has a type value of "IDR" or "I". In some embodiments, as represented by block 734, the properties of the one or more key pictures include one or more of a start offset of a respective key picture, a size of the respective key picture, and a timestamp associated with the respective key picture. For example, in the mapping file as shown in FIG. 2C, the intermediate packager specifies the start offset of each key picture within the parent intermediate unit, the size of the key picture, and the timestamp associated with the key picture. In some embodiments, for trick mode, as represented by block 736, when the media content is linear content, the one or more key pictures specified in the one or more maps are within a time shift buffer depth for the linear content. Also for trick mode, in some other embodiment, as represented by block 738, when the media content is a video-on-demand (VOD) media content item that includes a plurality of segments, the one or more maps further include mappings of a plurality of key pictures to a plurality of intermediate units corresponding to the plurality of segments.

In some embodiments, as represented by block 740, generating the one or more maps includes generating a mapping file for a bandwidth, where the properties in the mapping file specify a start offset for a respective key picture of the one or more key pictures packaged according to the bandwidth. For example, in FIG. 1, the intermediate packager 116 maintains the mapping file for each video bandwidth to capture the proper start offset for a given bandwidth. In such embodiments, as represented by block 742, when the server receives a key picture request for a respective key picture of the one or more key pictures that includes bandwidth parameters, the server locates the mapping file corresponding to the bandwidth parameters. As such, each key picture would have the proper start offset for the bandwidth.

Turning to FIG. 7B, as represented by block 750, the method 700 continues with the server (e.g., the JIT packager 120, FIG. 1) packaging the intermediate unit into one or more key picture units according to the one or more maps. As such, the JIT packager picks up the relevant intermediate unit and converts it for ABR streaming, e.g., packaging the content in formats such as DASH or HLS and constructing manifest. In some embodiments, as represented by block 752, packaging the intermediate unit into the one or more key picture units includes receiving a request for a respective key picture of the one or more key pictures, fetching a portion including the respective key picture from the intermediate unit based on the one or more maps in response to the request, and constructing a key picture unit based on the portion and providing the key picture unit. Further, in such embodiments, as represented by block 754, the request referencing the respective key picture is originated from a client device and includes one or more of a trick mode play, a thumbnail scrubbing, seeking a safe seek point, seeking to a latest unit of live content, and inserting targeted content in accordance with some embodiments.

For example, when a client device sends a key picture request during trick mode play, thumbnail scrubbing, seeking a safe seek point, seeking to a latest unit of live content, and/or inserting targeted content, in steps 550 and 560 of FIG. 5, the JIT packager 120 receives the key picture request and locates the up-to-date mapping file for the request. Further, in step 570 of FIG. 5, based on the mapping file, the JIT packager 120 fetches the required portion for the key picture from the parent intermediate unit and constructs the key unit, e.g., according to DASH or HLS format, and responds to the client device with the created key unit.

In some embodiments, as represented by block 760, the method 700 further includes publishing the type of the key picture for each of the one or more key pictures in a manifest according to the one or more maps. In some embodiments, the publishing includes inserting in the manifest a reference to each of the one or more key pictures and the type of each of the one or more key pictures. In such embodiments, as represented by block 762, the manifest is an HTTP Live Streaming (HLS) playlist or a Dynamic Adaptive Streaming over HTTP (DASH) Media Presentation Description (MPD) file.

For example, in steps 530 and 540 of FIG. 5, upon being requested by the client device for a manifest, e.g., a request for a DASH MPD file or a request for an I-frame manifest for HLS, the JIT packager 120 obtains the up-to-date and the appropriate mapping file along with the manifest for the intermediate units (e.g., a CIF manifest or a CMAF manifest). The JIT packager then parses the mapping file and includes the key picture information at the appropriate location. For example, in FIG. 3B, the JIT packager inserts the key picture information in the I-frame adaptation set for DASH MPD. In another example, in FIG. 4B, the JIT packager inserts the key picture information in the I-frame manifest or playlist for HLS.

Figure 8A:
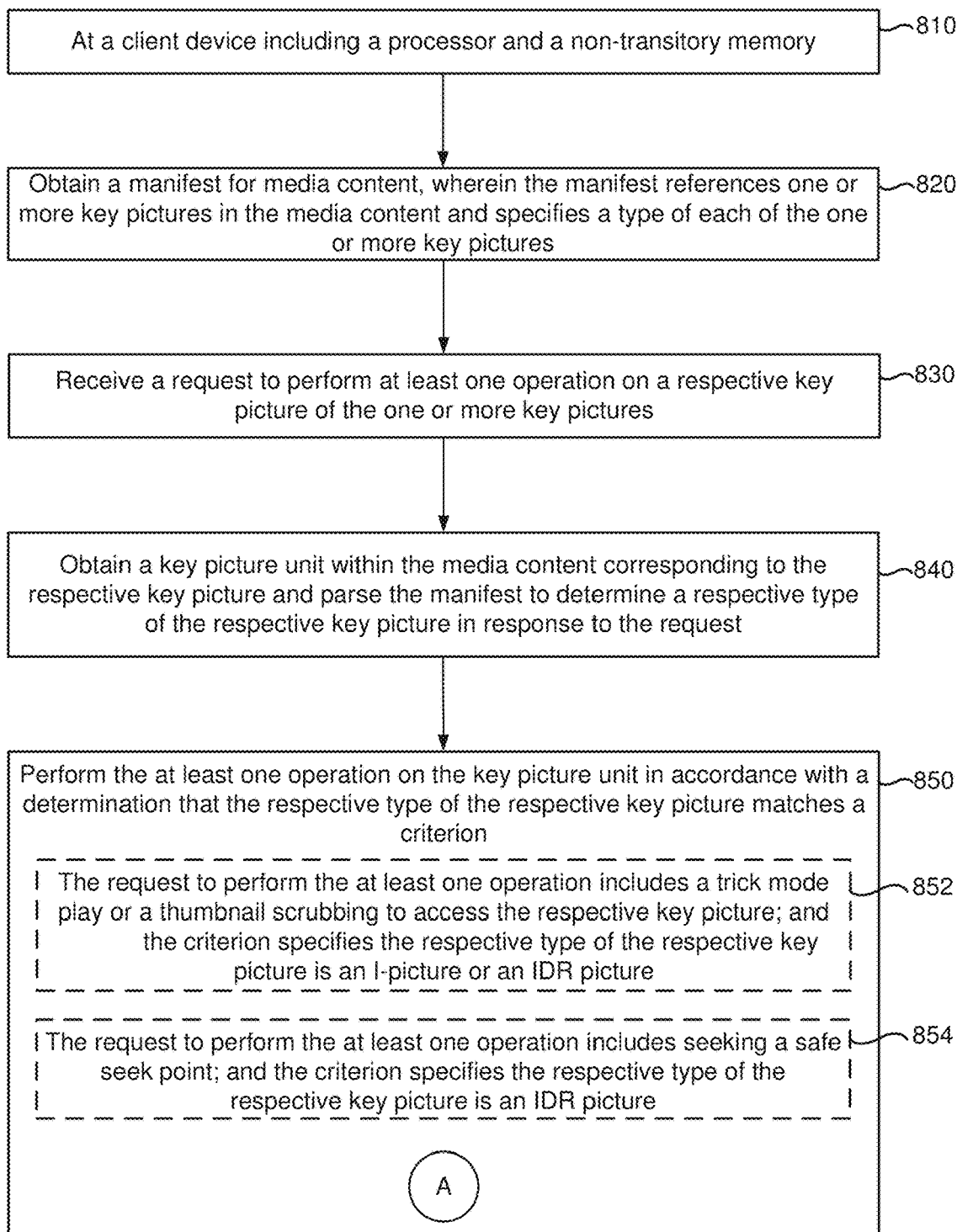

FIGS. 8A and 8B are flowcharts illustrating a method 800 of using published key picture information for operations on a client device in accordance with some embodiments. In some embodiments, as represented by block 810, the method 800 is performed at a client device, e.g., the client device 140 in FIG. 1. In some embodiments, the client device includes a processor (e.g., the processor for executing instructions for the playlist controller 142, the player 144, and/or the splicer 146, FIG. 1) and a non-transitory memory (e.g., a non-transitory memory for storing the targeted content in the targeted content store 148, FIG. 1).

The method 800 begins, as represented by block 820, with the client device (e.g., the playlist controller 142, FIG. 1) obtaining a manifest for media content, where the manifest references one or more key pictures in the media content and specifies a type of each of the one or more key pictures. For example, in FIG. 3B, the DASH MPD references the key pictures identified by the intermediate packagers and the type of each of the key pictures with the custom attribute s@ty. In another example, in FIG. 4B, the HLS manifest references the key pictures and the type of each of the key pictures with EXT-X-KEY-FRAME-TYPE tag.

As represented by block 840, the method 800 continues with the client device (e.g., the player 144, FIG. 1) receiving a request to perform at least one operation on a respective key picture of the one or more key pictures, e.g., trick mode, thumbnail scrubbing, seeking within segment, seeking to the start of the last IDR or the closest point to live content, and/or targeted content substitution, etc. As represented by block 850, the method 800 continues with the client device (e.g., facilitated by the playlist controller 142 and/or the player 144, FIG. 1) obtaining a key picture unit within the media content corresponding to the respective key picture and parsing the manifest to determine a respective type of the respective key picture in response to the request. As represented by block 860, the method 800 continues with the client device (e.g., facilitated by the player 144, FIG. 1) performing the at least one operation on the key picture unit in accordance with a determination that the respective type of the respective key picture matches a criterion.

In some embodiments, as represented by block 852, the request to perform the at least one operation includes a trick mode play or a thumbnail scrubbing to access the respective key picture. In such embodiments, the criterion specifies the respective type of the respective key picture is an I-picture or an IDR picture. In other words, for trick mode play and/or thumbnail scrubbing, each individual key picture is accessible and the player can utilize any key picture for improved user experience.

In some embodiments, as represented by block 854, the request to perform the at least one operation includes seeking a safe seek point. In such embodiments, the criterion specifies the respective type of the respective key picture is an IDR picture. In other words, for seeking within a unit such as a segment, the start of an IDR picture can be used as a safe seek point. As such, seeking within segment is possible when an IDR picture exists within the segment after the start of the segment. For example, without publishing every key picture within the segment, relying on the DASH MPD in FIG. 3A, one IDR picture at the start of the segment with the timestamp 143974041678726 can be used by a seeking operation as a safe seek point. In contrast, once the key picture information for every key picture is published, in FIG. 3B, either the IDR picture with the timestamp 143974041678726 at the start of the segment or the IDR picture with the timestamp 143974042038726 within the same segment can be used by a seek operation as a safe seek point. In another example, without publishing every key picture within the segment, relying on the HLS manifest in FIG. 4A, one IDR picture at the start of 143694618050455.m4f can be used by a seeking operation as a safe seek point. In contrast, once publishing every key picture information, in FIG. 4B, either the IDR picture at the start of 143694618050455.m4f or the IDR picture referenced by 143694618410455.m4f within the same unit can be used by a seek operation as a safe seek point.

Turning to FIG. 8B, in some embodiments, as represented by block 856, when the media content is live content, the request to perform the at least one operation includes seeking to a latest unit of the live content. In such embodiments, the criterion specifies the respective type of the respective key picture is an IDR picture. Further, in such embodiments, performing the at least one operation includes identifying the respective key picture being a last key picture within the latest unit, and seeking to the last key picture within the latest unit in accordance with the determination that the respective type of the respective key picture is the IDR picture. In other words, when seeking to the closest point of live content, seeking to the start of the last IDR picture in the latest segment of the live content is closer than seeking to the start of the latest segment, thus providing a closer to live viewing experience.

In some embodiments, as represented by block 858, the request to perform the at least one operation includes inserting targeted content starting at the respective key picture. In such embodiments, the criterion specifies the respective type of the respective key picture is an IDR picture. Further, in such embodiments, performing the at least one operation includes identifying a first timestamp of the respective key picture and a second timestamp of an IDR picture within a unit according to the manifest, and inserting the targeted content within the unit between the first timestamp and the second timestamp. For example, as shown in FIGS. 6A and 6B, the targeted content 635 can be inserted within unit 3 610-3 between the start of two IDR pictures 620-1 and 620-2 to ensure smooth playback.

In some embodiments, as represented by block 860, the method 800 further includes receiving the key picture unit within the media content according to the manifest, where the key picture unit includes the respective key picture and is generated by a packager at a server fetching a portion from an intermediate unit including the respective key picture according to a map and packaging the portion into the key picture unit.

Figure 9:
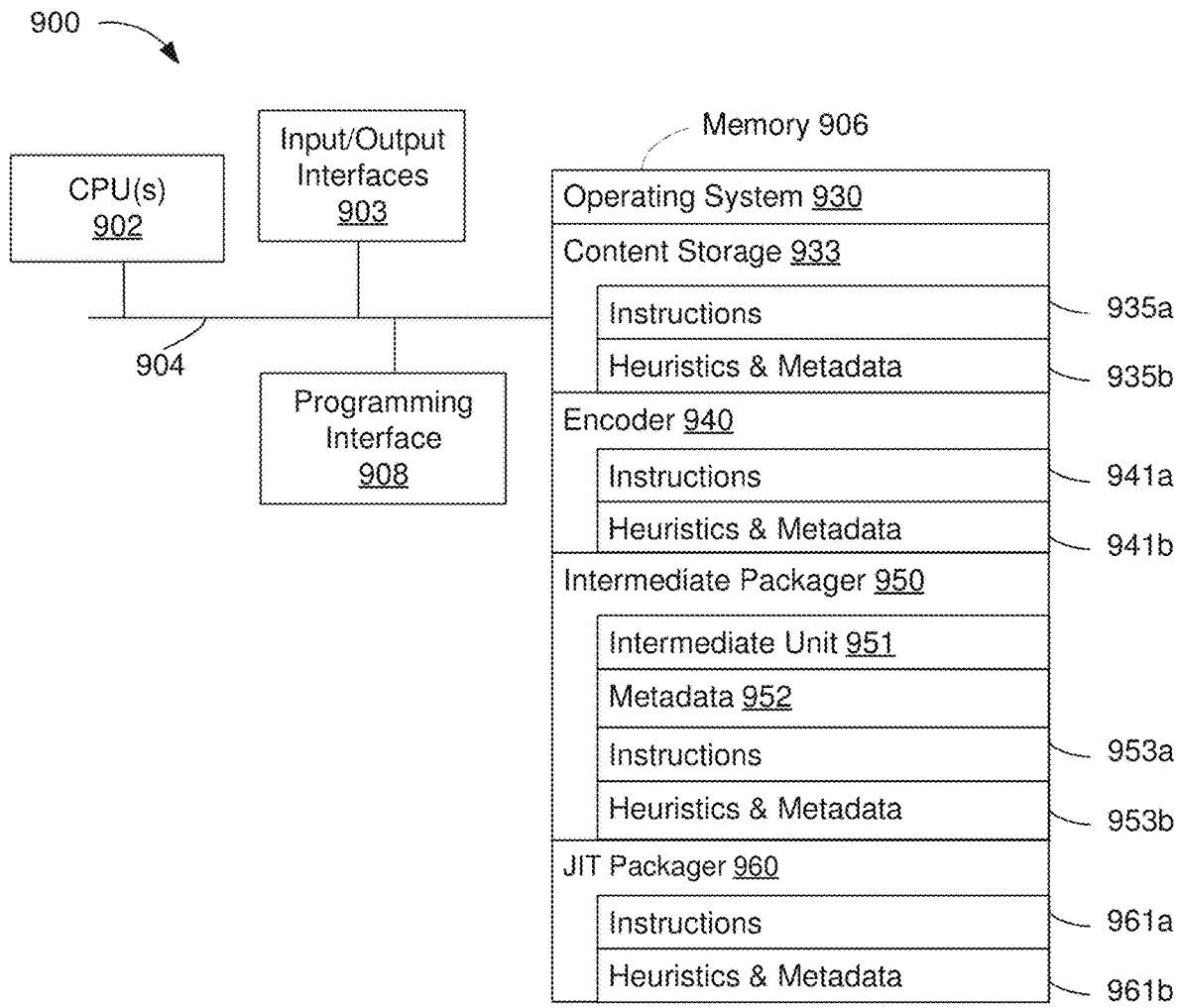
FIG. 9 is a block diagram of a computing device for packaging and publishing key pictures, in accordance with some embodiments.

FIG. 9 is a block diagram of a computing device 900 for packaging and publishing key pictures in accordance with some embodiments. In some embodiments, the computing device 900 corresponds to the server 110 in FIG. 1 and performs one or more of the functionalities described above with respect to the server 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPUs) 902 (e.g., processors), one or more input/output interfaces 903 (e.g., input devices, sensors, a network interface, a display, etc.), a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930, a content storage module 933, an encoder 940, an intermediate packager 950, and a JIT packager 960. In some embodiments, one or more instructions are included in a combination of logic and non-transitory memory. The operating system 930 includes procedures for handling various basic system services and for performing hardware dependent tasks.

In some embodiments, the content storage module 933 (e.g., the content storage 114 in FIG. 1) stores multimedia content. To that end, the content storage module 933 includes a set of instructions 935a and heuristics and metadata 935b.

In some embodiments, the encoder 940 (e.g., the encoder 112 in FIG. 1) is configured to encoder the content from the content storage module 933. To that end, the encoder 940 includes a set of instructions 941a and heuristics and metadata 941b.

In some embodiments, the intermediate packager 950 (e.g., the intermediate packager 116 in FIG. 1) is configured to package the encoded content from the encoder 940 into intermediate units 951 (e.g., the intermediate units 117 in FIG. 1) and generate the corresponding metadata 952 (e.g., the metadata 118 in FIG. 1). To that end, the intermediate packager 950 includes a set of instructions 953a and heuristics and metadata 953b.

In some embodiments, the JIT packager 960 (e.g., the JIT packager 120 in FIG. 1) is configured to package the intermediate units 951 and the corresponding metadata 952 to formats for streaming to the client. To that end, the JIT packager 960 includes a set of instructions 961a and heuristics and metadata 961b.

Although the content storage module 933, the encoder 940, the intermediate packager 950, and the JIT packager 960 are illustrated as residing on a single computing device 900, it should be understood that in other embodiments, any combination of the content storage module 933, the encoder 940, the intermediate packager 950, and the JIT packager 960 can reside in separate computing devices in various embodiments. For example, in some embodiments, each of the content storage module 933, the encoder 940, the intermediate packager 950, and the JIT packager 960 resides on a separate computing device.

Moreover, FIG. 9 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 10:
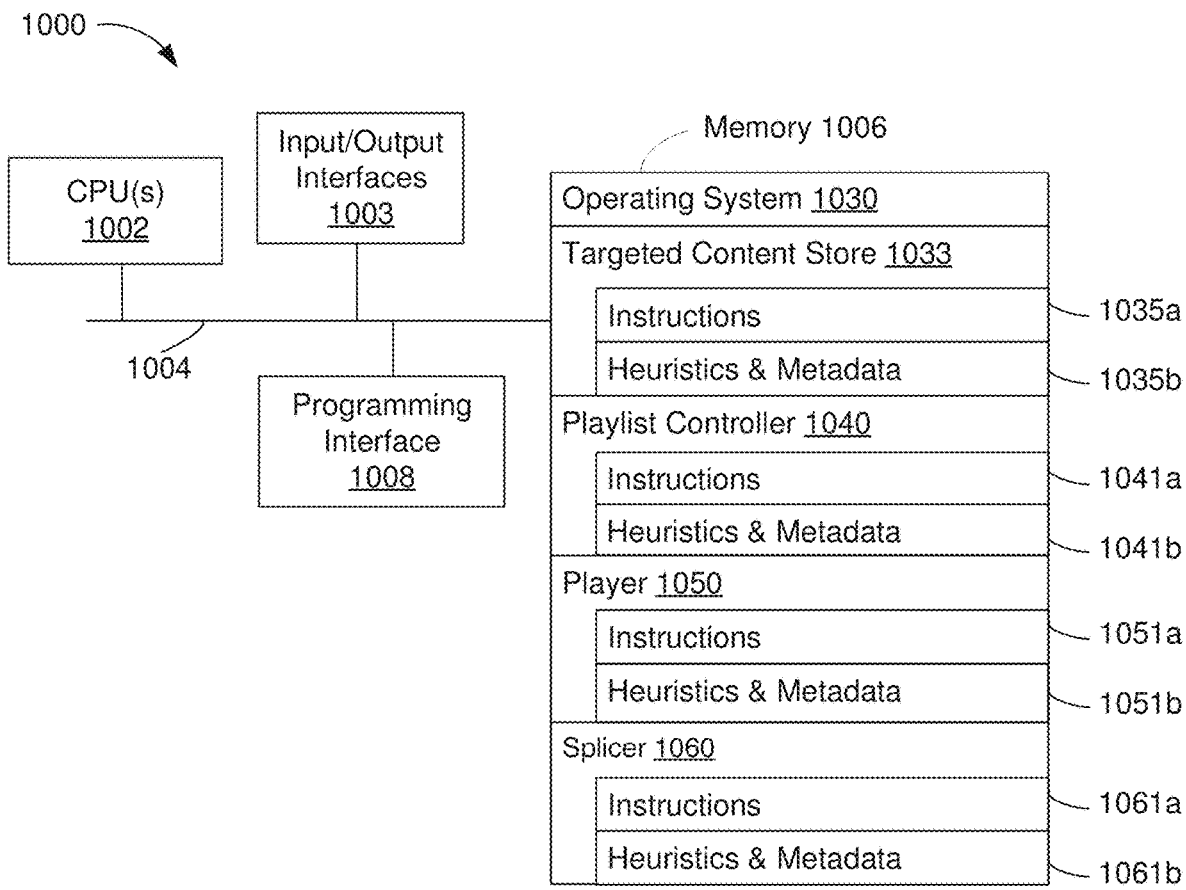
FIG. 10 is a block diagram of a computing device for using the published key picture information for content consumption, in accordance with some embodiments.

FIG. 10 is a block diagram of a computing device 1000 for using the published key picture information for content consumption in accordance with some embodiments. In some embodiments, the computing device 1000 corresponds to the client device 140 in FIG. 1 and performs one or more of the functionalities described above with respect to the client device 140. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1000 includes one or more processing units (CPUs) 1002 (e.g., processors), one or more input/output interfaces 1003 (e.g., input devices, sensors, a network interface, a display, etc.), a memory 1006, a programming interface 1008, and one or more communication buses 1004 for interconnecting these and various other components.

In some embodiments, the communication buses 1004 include circuitry that interconnects and controls communications between system components. The memory 1006 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 comprises a non-transitory computer readable storage medium. Moreover, in some embodiments, the memory 1006 or the non-transitory computer readable storage medium of the memory 1006 stores the following programs, modules and data structures, or a subset thereof including an optional operating system 1030, a targeted content store 1033, a playlist controller 1040, a player 1050, and a splicer 1060. In some embodiments, one or more instructions are included in a combination of logic and non-transitory memory. The operating system 1030 includes procedures for handling various basic system services and for performing hardware dependent tasks.

In some embodiments, the targeted content store 1033 (e.g., the targeted content store 148 in FIG. 1) stores targeted content (e.g., advertisements). To that end, the targeted content store 1033 includes a set of instructions 1035*a* and heuristics and metadata 1035*b*.

In some embodiments, the playlist controller 1040 (e.g., the playlist controller 142 in FIG. 1) is configured to obtain playlist and/or manifest from the server. To that end, the playlist controller 1040 includes a set of instructions 1041*a* and heuristics and metadata 1041*b*.

In some embodiments, the player 1050 (e.g., the player 144 in FIG. 1) is configured to obtain the content from the server according to the playlist and/or manifest and play the content. To that end, the player 1050 includes a set of instructions 1051*a* and heuristics and metadata 1051*b*.

In some embodiments, the splicer 1060 (e.g., the splicer 146 in FIG. 1) is configured to substitute the content with targeted content from the targeted content store 1033 and/or insert the targeted content into the content. To that end, the splicer 1060 includes a set of instructions 1061*a* and heuristics and metadata 1061*b*.

Although the targeted content store 1033, the playlist controller 1040, the player 1050, and the splicer 1060 are illustrated as residing on a single computing device 1000, it should be understood that in other embodiments, any combination of the playlist controller 1040, the player 1050, and the splicer 1060 can reside in separate computing devices in various embodiments. For example, in some embodiments, each of the playlist controller 1040, the player 1050, and the splicer 1060 resides on a separate computing device.

Moreover, FIG. 10 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:

at a server including one or more processors and a non-transitory memory:

creating an intermediate unit from media content and identifying multiple key pictures within the intermediate unit that are of different types, including a first key picture that is of a first type and a second key picture that is of a second type, different from the first type;

recording one or more maps while creating the intermediate unit and upon identifying the multiple key pictures, wherein the one or more maps specify a type of each of the multiple key pictures, properties of the multiple key pictures within the intermediate unit, and an association of each of the multiple key pictures to the intermediate unit, including indicating whether the type is the first type or the second type; and packaging the intermediate unit into multiple key picture units for streaming according to the one or more maps, including specifying in a manifest facilitating the streaming a respective type of a respective key picture within each of the multiple key picture units.

2. The method of claim 1, wherein the first type indicates an I-picture and the second type indicates an instantaneous decoding refresh (IDR) picture.

3. The method of claim 1, wherein the properties of the multiple key pictures include one or more of a start offset of a respective key picture, a size of the respective key picture, and a timestamp associated with the respective key picture.

4. The method of claim 1, wherein the media content is linear content, and the multiple key pictures specified in the one or more maps are within a time shift buffer depth for the linear content.

5. The method of claim 1, wherein the media content is a video-on-demand (VOD) media content item including a plurality of segments, and the one or more maps further include mappings of a plurality of key pictures to a plurality of intermediate units corresponding to the plurality of segments.

6. The method of claim 1, wherein generating the one or more maps includes:

generating a mapping file for a bandwidth, wherein the properties in the mapping file specify a start offset for a respective key picture of the multiple key pictures packaged according to the bandwidth.

7. The method of claim 6, further comprising:

receiving a key picture request for a respective key picture of the multiple key pictures, the key picture request includes bandwidth parameters; and locating the mapping file corresponding to the bandwidth parameters.

8. The method of claim 1, wherein packaging the intermediate unit into the multiple key picture units includes:

receiving a request for a respective key picture of the multiple key pictures;

fetching a portion including the respective key picture from the intermediate unit based on the one or more maps in response to the request; and constructing a key picture unit based on the portion and providing the key picture unit.

9. The method of claim 8, wherein the request referencing the respective key picture is originated from a client device and includes one or more of a trick mode play, a thumbnail scrubbing, seeking a safe seek point, seeking to a latest unit of live content, and inserting targeted content.

10. The method of claim 1, further comprising publishing the type of the key picture for each of the multiple key pictures in the manifest according to the one or more maps, including:

inserting in the manifest a reference to each of the multiple key pictures and the type of each of the multiple key pictures.

11. The method of claim 10, wherein the manifest is an HTTP Live Streaming (HLS) playlist or a Dynamic Adaptive Streaming over HTTP (DASH) Media Presentation Description (MPD) file.

12. A method comprising:

at a client device including a processor and a non-transitory memory:

obtaining a manifest for media content, wherein the manifest references multiple key pictures that are of different types in the media content and specifies a type of each of the multiple key pictures, wherein the type is indicated upon identifying the multiple key pictures when creating an intermediate unit from the media content for packaging into key picture units;

receiving a request to perform at least one operation on a respective key picture of the multiple key pictures;

obtaining a key picture unit of the multiple key picture units corresponding to the respective key picture and parsing the manifest to determine a respective type of the respective key picture in response to the request; and performing the at least one operation on the key picture unit in accordance with a determination that the respective type of the respective key picture matches a criterion.

13. The method of claim 12, wherein:

the request to perform the at least one operation includes a trick mode play or a thumbnail scrubbing to access the respective key picture; and the criterion specifies the respective type of the respective key picture is an I-picture or an IDR picture.

14. The method of claim 12, wherein:

the request to perform the at least one operation includes seeking a safe seek point; and the criterion specifies the respective type of the respective key picture is an IDR picture.

15. The method of claim 12, wherein:

the media content is live content;

the request to perform the at least one operation includes seeking to a latest unit of the live content;

the criterion specifies the respective type of the respective key picture is an IDR picture; and performing the at least one operation includes:

identifying the respective key picture being a last key picture within the latest unit; and seeking to the last key picture within the latest unit in accordance with the determination that the respective type of the respective key picture is the IDR picture.

16. The method of claim 12, wherein:

the request to perform the at least one operation includes inserting targeted content starting at the respective key picture;

the criterion specifies the respective type of the respective key picture is an IDR picture; and performing the at least one operation includes:

identifying a first timestamp of the respective key picture and a second timestamp of an IDR picture within a unit according to the manifest; and inserting the targeted content within the unit between the first timestamp and the second timestamp.

17. The method of claim 12, further comprising:

receiving the key picture unit within the media content according to the manifest, wherein the key picture unit includes the respective key picture and is generated by a packager at a server fetching a portion from the intermediate unit including the respective key picture according to a map and packaging the portion into the key picture unit.

18. A system comprising:

a server including an intermediate packager and a just-in-time (JIT) packager, wherein:

the intermediate packager is operable to create an intermediate unit from media content and identify multiple key pictures within the intermediate unit that are of different types, including a first key picture that is of a first type and a second key picture that is of a second type, different from the first type, and record one or more maps while creating the intermediate unit and upon identifying the multiple key pictures, wherein the one or more maps specify a type of each of the multiple key pictures, properties of the multiple key pictures within the intermediate unit, and an association of each of the multiple key pictures to the intermediate unit, including indicating whether the type is the first type or the second type; and the JIT packager is operable to package the intermediate unit into multiple key picture units for streaming according to the one or more maps, including specifying in a manifest facilitating the streaming a respective type of a respective key picture within each of the multiple key picture units; and a client device including a processor and a non-transitory memory and operable to:

obtain a manifest for the media content, wherein the manifest references the multiple key pictures in the media content and specifies the type of each of the multiple key pictures;

receive a request to perform at least one operation on a respective key picture of the multiple key pictures;

obtain a key picture unit of the multiple key picture units corresponding to the respective key picture and parse the manifest to determine a respective type of the respective key picture in response to the request; and perform the at least one operation on the key picture unit in accordance with a determination that the respective type of the respective key picture matches a criterion.

19. The system of claim 18, wherein the type of each of the multiple key pictures indicates an I-picture or an instantaneous decoding refresh (IDR) picture.

20. The system of claim 18, wherein the properties of the multiple key pictures include one or more of a start offset of a respective key picture, a size of the respective key picture, and a timestamp associated with the respective key picture.

* * * * *